US010313856B2

(12) United States Patent
Hu et al.

(10) Patent No.: US 10,313,856 B2
(45) Date of Patent: Jun. 4, 2019

(54) UNIFIED COMMUNICATION SYSTEM BASED ON MICRO BASE STATION

(71) Applicant: COMBA TELECOM SYSTEMS (China) Ltd., Guangdong (CN)

(72) Inventors: Yingtian Hu, Guangdong (CN); Kai Li, Guangdong (CN)

(73) Assignee: COMBA TELECOM SYSTEMS (CHINA) LTD., Guangdong (CN)

( * ) Notice: Subject to any disclaimer, the term of this patent is extended or adjusted under 35 U.S.C. 154(b) by 21 days.

(21) Appl. No.: 15/539,723

(22) PCT Filed: Aug. 24, 2015

(86) PCT No.: PCT/CN2015/087903
§ 371 (c)(1),
(2) Date: Jun. 28, 2017

(87) PCT Pub. No.: WO2016/107195
PCT Pub. Date: Jul. 7, 2016

(65) Prior Publication Data
US 2017/0366918 A1 Dec. 21, 2017

(30) Foreign Application Priority Data

Dec. 29, 2014 (CN) .......................... 2014 1 0848235

(51) Int. Cl.
*H04M 1/66* (2006.01)
*H04W 4/60* (2018.01)
(Continued)

(52) U.S. Cl.
CPC ........... *H04W 4/60* (2018.02); *H04L 65/1016* (2013.01); *H04L 65/1033* (2013.01);
(Continued)

(58) Field of Classification Search
USPC ............................ 370/328, 332; 455/67.11
See application file for complete search history.

(56) References Cited

U.S. PATENT DOCUMENTS 5,995,843 A    11/1999  Sjodin et al.
2004/0192211 A1*  9/2004  Gallagher ......... H04M 3/42246
                                                       455/67.11
(Continued)

FOREIGN PATENT DOCUMENTS

CN    101465914 A    6/2009
CN    101965693 A    2/2011
(Continued)

*Primary Examiner* — David Q Nguyen
(74) *Attorney, Agent, or Firm* — Arent Fox LLP; Michael Fainberg

(57) ABSTRACT

The present invention disclosed a unified communication system based on micro base station. The system includes: a micro base station subsystem, a landline telephone network subsystem, an office network subsystem and a communication switching subsystem. The communication switching subsystem receives a voice service request from the micro base station subsystem and the landline telephone network subsystem, sends the voice service request to the micro base station subsystem when a called user in the voice service request is a mobile communication intranet user, sends the voice service request to the landline telephone network subsystem when the called user in the voice service request is a landline telephone network user, receives a service request from the micro base station subsystem, and sends the service request to the office network subsystem.

15 Claims, 11 Drawing Sheets

(51) Int. Cl.
    *H04L 29/06*         (2006.01)
    *H04M 7/12*          (2006.01)
    *H04W 12/06*        (2009.01)
    *H04W 84/04*        (2009.01)
    *H04W 88/08*        (2009.01)
    *H04W 88/16*        (2009.01)
    *H04M 3/42*          (2006.01)
    *H04M 7/00*          (2006.01)

(52) U.S. Cl.
    CPC ...... *H04L 65/1046* (2013.01); *H04L 65/1053* (2013.01); *H04L 65/1069* (2013.01); *H04M 7/128* (2013.01); *H04M 3/42314* (2013.01); *H04M 7/009* (2013.01); *H04M 2207/187* (2013.01); *H04W 12/06* (2013.01); *H04W 84/045* (2013.01); *H04W 88/08* (2013.01); *H04W 88/16* (2013.01)

(56) References Cited

U.S. PATENT DOCUMENTS

| | | | |
|---|---|---|---|
| 2009/0286506 A1 | 11/2009 | Gu et al. | |
| 2010/0002626 A1* | 1/2010 | Schmidt | H04W 88/085 |
| | | | 370/328 |
| 2012/0099562 A1* | 4/2012 | Smadi | H04W 36/08 |
| | | | 370/332 |

FOREIGN PATENT DOCUMENTS

| | | |
|---|---|---|
| CN | 104486358 A | 4/2015 |
| CN | 104618895 A | 5/2015 |
| WO | 01/60010 A2 | 8/2001 |

* cited by examiner

UNIFIED COMMUNICATION SYSTEM BASED ON MICRO BASE STATION

CROSS-REFERENCE TO RELATED APPLICATIONS

This application is a National Stage of International Application No. PCT/CN2015/087903, filed Aug. 24, 2015, which claims priority of Chinese Patent Application No. 201410848235.6, filed Dec. 29, 2014, both of which are hereby incorporated by reference in their entireties.

FIELD

The present invention relates to the field of wireless communication technology, and particularly to a unified communication system based on micro base station.

BACKGROUND

Enterprise network is a private network or a virtual private network established inside an enterprise and providing services for the business activities of the enterprise.

Currently the enterprise network popularly used is a communication system based on unified Centrex service, wherein the system is based on a Service Delivery Platform (SDP) service model of telecommunication operator IP Multimedia Subsystem (IMS) network. The unified Centrex service is a realization of such kind of service on the IMS, covers all business operations, supports multiple user access methods, and provides converged services to the users of the IMS and CS-domain mobile phones.

However, the unified Centrex service based on the IMS/SDP service model mainly focuses on operator network, and thus has very distinctive operational and controlling characteristics; the system is highly complicated and has high costs of deployment and usage. Meanwhile, the IMS/SDP architecture doesn't provide sufficient support for the IT system widely used in enterprises, and thus is difficult to meet the requirements of enterprise users.

Therefore, it is in urgent need to provide a communication system which could overcome the problems of existing communication systems such as high complexity and high costs of deployment and usage.

SUMMARY

The embodiments of the present invention provide a unified communication system based on micro base station, to solve the problems of existing communication systems such as high complexity and high costs of deployment and usage.

To achieve the abovementioned goals, the embodiments of the present invention provide a unified communication system based on micro base station. The system includes: a micro base station subsystem, a landline telephone network subsystem, an office network subsystem and a communication switching subsystem, wherein the micro base station subsystem, the landline telephone network subsystem, and the office network subsystem are connected with the communication switching subsystem respectively;

The micro base station subsystem is configured to receive a voice service request from a mobile terminal, and send the voice service request to the communication switching subsystem; receive a voice service request from the communication switching subsystem, and send the voice service request from the communication switching subsystem to a mobile terminal corresponding to identification information of a called user in the voice service request;

The landline telephone network subsystem is configured to receive a voice service request from a landline telephone terminal or a Public Switching Telephone Network (PSTN), and send the voice service request to the communication switching subsystem when a called user in the voice service request is a mobile communication user; receive a voice service request from the communication switching subsystem, connect to an intranet landline telephone terminal corresponding to identification information of a called user in the voice service request when the called user in the voice service request is an intranet landline telephone user, or send the voice service request to the PSTN when the called user in the voice service request is an extranet landline telephone user;

The office network subsystem is configured to receive a service request from the communication switching subsystem, and when the service request is an office service request, process an office service, or when the service request is a data service request, send the data service request to the Internet;

The communication switching subsystem is configured to receive a voice service request from the micro base station subsystem and the landline telephone network subsystem, send the voice service request to the micro base station subsystem when a called user in the voice service request is a mobile communication intranet user, or send the voice service request to the landline telephone network subsystem when the called user in the voice service request is a landline telephone network user, wherein landline telephone network users include intranet landline telephone users and extranet landline telephone users, mobile communication users include mobile communication intranet users; receive a service request from the micro base station subsystem, and send the service request to the office network subsystem.

Preferably, the system further includes an application service subsystem, wherein the application service subsystem connects with the communication switching subsystem;

The application service subsystem is configured to receive an application service request through the communication switching subsystem, process an application service and send an application service request to the communication switching subsystem;

The communication switching subsystem is configured to receive an application service request from the application service subsystem, send the application service request to the micro base station subsystem when a called user in the application service request is a mobile communication intranet user, or send the application service request to the landline telephone network subsystem when the called user in the application service request is a landline telephone network user;

The mobile communication users further include mobile communication extranet users.

Preferably, the system further includes a gateway subsystem and a network management subsystem, wherein the network management subsystem and the communication switching subsystem are connected with each other and the communication switching subsystem is connected with an operator core network via the gateway subsystem;

the gateway subsystem is configured to receive a voice service request or an application service request from the communication switching subsystem, and send the voice service request or the application service request to the operator core network, wherein a user in the voice service request or the application service request from the communication switching subsystem is a mobile communication extranet user;

the network management subsystem is configured to monitor and manage the micro base station system, the gateway subsystem, the landline telephone network subsystem, the office network subsystem and the application service subsystem, as well as to manage an authentication of a mobile terminal so as to implement an authentication between a user and the network;

the communication switching subsystem is further configured to receive a voice service request from the gateway subsystem, send the voice service request to the micro base station subsystem when a called user in the voice service request is a mobile communication intranet user, or send the voice service request to the landline telephone network subsystem when the called user in the voice service request is a landline telephone network user; and after having received a voice service request from the micro base station subsystem or the landline telephone network subsystem, send the voice service request to the gateway subsystem when the called user in the voice service request is a mobile communication extranet user; or after having received an application service request from the application service subsystem, send the application service request to the gateway subsystem when the called user in the application service request is a mobile communication extranet user.

Preferably, the gateway subsystem includes a signaling gateway and a security gateway, wherein the security gateway is connected to the communication switching subsystem; the signaling gateway is connected to both the security gateway and the operator core network, and is located between the security gateway and the operator core network.

Preferably, the landline telephone network subsystem, is further configured to, after having received a voice service request from a landline telephone terminal, connect with an intranet landline telephone terminal corresponding to the identification information of called user in the voice service request if the called user in the voice service request is an intranet landline telephone user, or forward the voice service request to the PSTN if the called user in the voice service request is an extranet landline telephone user.

Preferably, after having received a voice service request from the micro base station subsystem or the gateway subsystem, the communication switching subsystem converts the voice service request into landline telephone communication information and sends it to the landline telephone network subsystem when the called user in the voice service request is a landline telephone network user.

Preferably, after having received a voice service request from the landline telephone network subsystem, the communication switching subsystem converts the voice service request into a mobile communication voice service request and sends it to the gateway subsystem or the micro base station subsystem when the called user in the voice service request is a mobile communication user.

Preferably, the micro base station subsystem is a Femto micro base station subsystem or a Small Cell micro station subsystem.

The unified communication system based on micro base station according to the embodiments of the present invention is implemented by taking advantage of the system architectural features of the micro base station. During an internal communication process within an enterprise, a mobile terminal establishes its communication connection with a called mobile terminal or a landline telephone terminal via the micro base station subsystem and the communication switching subsystem, without making use of any operator core network (i.e. any public communication network). The whole internal communication process is completely implemented within the enterprise, and the communication connection with the office network is established by the micro base station subsystem via the communication switching subsystem. Therefore, unified communication of three networks is achieved and the problems of existing communication systems such as high complexity and high costs of deployment and usage are overcome.

BRIEF DESCRIPTION OF THE DRAWINGS

In order to make the technical solutions according to the embodiments of the invention art more apparent, the drawings to which a description of the embodiments refers will be briefly introduced below, and apparently the drawings to be described below are merely illustrative of some of the embodiments of the invention, and those ordinarily skilled in the art can derive other drawings from these drawings without any inventive effort.

DETAILED DESCRIPTION

In order to make the objects, technical solutions, and advantages of the embodiments of the invention more apparent, the technical solutions according to the embodiments of the invention will be described below clearly and fully with reference to the drawings in the embodiments of the invention, and apparently the embodiments described below are only a part but not all of the embodiments of the invention. Based upon the embodiments here of the invention, all the other embodiments which can occur to those skilled in the art without any inventive effort shall fall into the scope of the invention.

Figure 1:
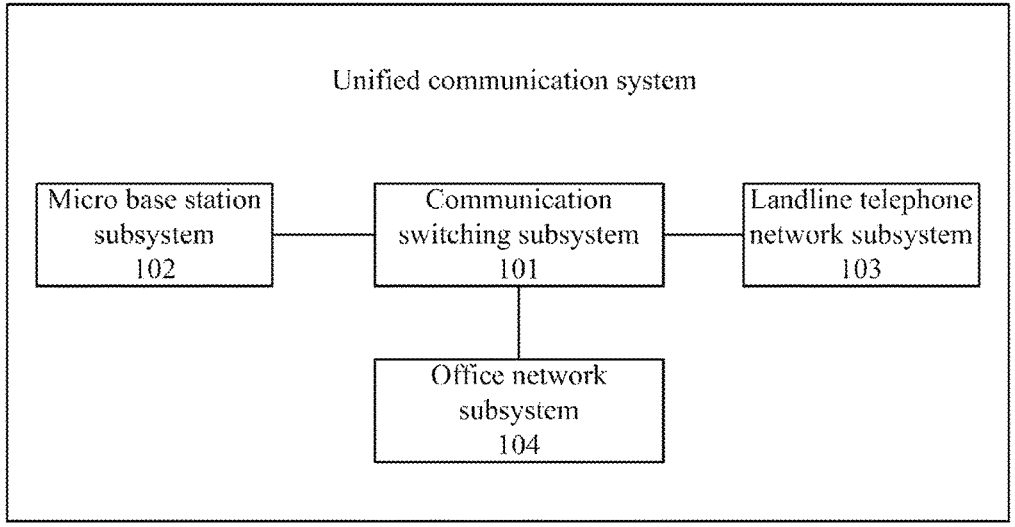
FIG. 1 is a structural schematic diagram of a unified communication system based on micro base station according to some embodiments of the present invention.

FIG. 1 illustrates the schematic structure of a unified communication system based on micro base station. As illustrated in FIG. 1, the unified communication system based on micro base station according to embodiments of the present invention includes: a micro base station 102, a landline telephone network subsystem 103, an office network subsystem 104 and a communication switching subsystem 101. The micro base station subsystem 102, the landline telephone network subsystem 103 and the office network subsystem 104 are connected to the communication switching subsystem 101 respectively, wherein the micro base station subsystem 102 could be implemented in possible ways such as a Femto (home base station) and a Small Cell (low power wireless access node).

The micro base station subsystem 102 is configured to receive a voice service request from a mobile terminal, send the voice service request to the communication switching subsystem 101, receive a voice service request from the communication switching subsystem 101 and send the voice service request from the communication switching subsystem 101 to a mobile terminal corresponding to identification information of a called user in the voice service request.

The landline telephone network subsystem 103 is configured to receive a voice service request from a landline telephone terminal or a PSTN (Public Switched Telephone Network), and send the voice service request to the communication switching subsystem 101 when a called user in the voice service request is a mobile communication user; receive a voice service request from the communication switching subsystem 101, connect to the intranet landline telephone terminal corresponding to identification information of a called user in the voice service request when the called user in the voice service request is an intranet landline telephone user, or forward the voice service request to the PSTN when the called user in the voice service request is an extranet landline telephone user.

The office network subsystem 104 is configured to receive a service request from the communication switching subsystem 101, and when the service request is an office service request, process an office service, or when the service request is a data service request, send the data service request to the Internet.

The communication switching subsystem 101 is configured to receive a voice service request from the micro base station subsystem 102 and the landline telephone network subsystem 103, send the voice service request to the micro base station subsystem 102 when a called user in the voice service request is a mobile communication intranet user, or send the voice service request to the landline telephone network subsystem 103 when the called user in the voice service request is a landline telephone network user, wherein landline telephone network users include intranet landline telephone users and extranet landline telephone users, mobile communication users include mobile communication intranet users; receive a service request from the micro base station subsystem 102, and send the service request to the office network subsystem 104.

The unified communication system based on micro base station according to the embodiments of the present invention is implemented by taking advantage of the system architectural features of the micro base station. During an internal communication process within an enterprise, a mobile terminal establishes its communication connection with a called mobile terminal or a landline telephone terminal via the micro base station subsystem 102 and the communication switching subsystem 101, without making use of any operator core network (i.e. any public communication network). The whole internal communication process is completely implemented within the enterprise, and the communication connection with the office network is established by the micro base station subsystem 102 via the communication switching subsystem 101. Therefore, unified communication of three networks is achieved and the problems of existing communication systems such as high complexity and high costs of deployment and usage are overcome.

The abovementioned embodiments are described with the two examples of communication between a mobile terminal and a landline telephone terminal within an enterprise, and communication between a mobile terminal within an enterprise and an extranet landline telephone user. Preferably, the landline telephone network subsystem 103 is further configured to, after having received a voice service request from a landline telephone terminal, connect to an intranet landline telephone terminal corresponding to identification information of the called user in the voice service request when the called user in the voice service request is an intranet landline telephone user, or forward the voice service request to the PSTN when the called user in the voice service request is an extranet landline telephone user.

As a result, communications between a mobile terminal within an enterprise or an intranet landline telephone terminal and an extranet landline telephone terminal as well as communications between two intranet landline telephone terminals can be implemented.

Figure 2:
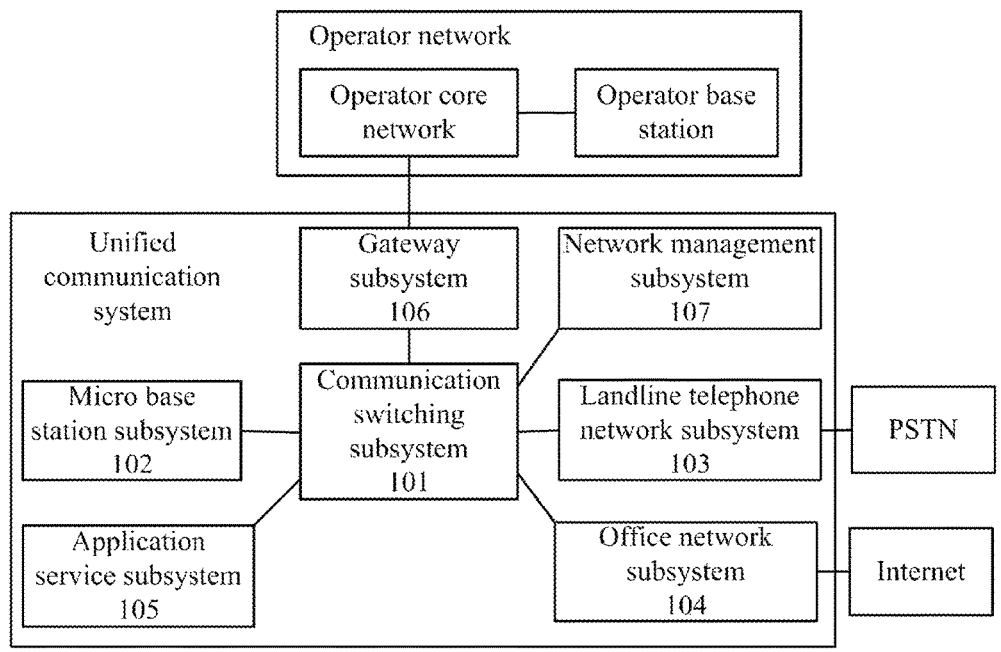
FIG. 2 is a structural schematic diagram of another unified communication system based on micro base station according to some embodiments of the present invention.

FIG. 2 illustrates a structure of another unified communication system based on micro base station according to embodiments of the present invention. As illustrated in FIG. 2, on the basis of the structure shown by FIG. 1, the unified system of this embodiment further includes a gateway subsystem 106, a network management subsystem 107 and an application service subsystem 105. The network management subsystem 107 and the application service subsystem 105 are connected to the communication switching subsystem 101 respectively, and the communication switching subsystem 101 is connected with an operator core network via the gateway subsystem 106.

In the embodiment, the gateway subsystem 106 is configured to receive a voice service request from the communication switching subsystem 101, and send the voice service request to the operator core network, wherein the user in the voice service request from the communication switching subsystem 101 is a mobile communication extranet user.

The network management subsystem 107 is configured to monitor and manage the micro base station system 102, the gateway subsystem 106, the landline telephone network subsystem 103, the office network subsystem 104 and the application service subsystem 105, as well as to manage an authentication of a mobile terminal so as to implement an authentication between a user and the network.

The application service subsystem 105 is configured to receive an application service request via the communication switching subsystem 101, process an application service and send an application service to the communication switching subsystem 101.

The communication switching subsystem 101 is further configured to receive a voice service request from the gateway subsystem 106, send the voice service request to the micro base station subsystem 102 when a called user in the voice service request is a mobile communication intranet user, or send the voice service request to the landline telephone network subsystem 103 when the called user in the voice service request is a landline telephone network user; and after having received a voice service request from the micro base station subsystem 102 or the landline telephone network subsystem 103, send the voice service request to the gateway subsystem 106 when the called user in the voice service request is a mobile communication extranet user; and after having received an application service request from the application service subsystem 105, send the application service request to the micro base station subsystem 102 when the called user in the application service request is a mobile communication intranet user, or send the application service request to the gateway subsystem 106 when the called user in the application service request is a mobile communication extranet user, or send the application service request to the landline telephone network subsystem 103 when the called user in the application service request is a landline telephone network user, wherein the mobile communication users further include a mobile communication extranet user.

During a communication process, the gateway subsystem 106 verifies the voice service request from the communication switching subsystem 101 and the process of communication between an intranet user and an extranet user.

Therefore, when it is needed to communicate with an extranet, it is only necessary to connect the gateway subsystem 106 to an operator public network, which drastically reduces the number of network elements connected to the operator public network and further improves the security of the communication with the external public network.

As the data formats transmitted by the mobile communication network and the landline telephone network are different, format conversion is necessary when communication between a mobile terminal and a landline telephone terminal is involved. In embodiments of the present invention, the format conversion process could be implemented by the communication switching subsystem 101, which is described in detail below.

After having received a voice service request from the micro base station subsystem 102 or the gateway subsystem 106, and when the called user in the voice service request is a landline telephone network user, the communication switching subsystem 101 converts the voice service request into landline telephone communication information and sends it to the landline telephone network subsystem 103.

After having received a voice service request from the landline telephone network subsystem 103, and when the called user in the voice service request is a mobile communication user, the communication switching subsystem 101 converts the voice service request into a mobile communication voice service request which is then sent to the gateway subsystem 106 or the micro base station subsystem 102, which means, if the called user in the voice service request is a mobile communication intranet user, then the voice service request is converted into a mobile communication voice service request and sent to the micro base station subsystem 102; and if the called user in the voice service request is a mobile communication extranet user, then the voice service request is converted into a mobile communication voice service request and sent to the operator core network via the gateway subsystem 106.

The specific data format of the mobile communication and the specific methods of the landline telephone network could adopt any form that already exists or might appear in the future. The corresponding method of data format conversion may also adopt any method that already exists or might appear in the future.

Figure 3:
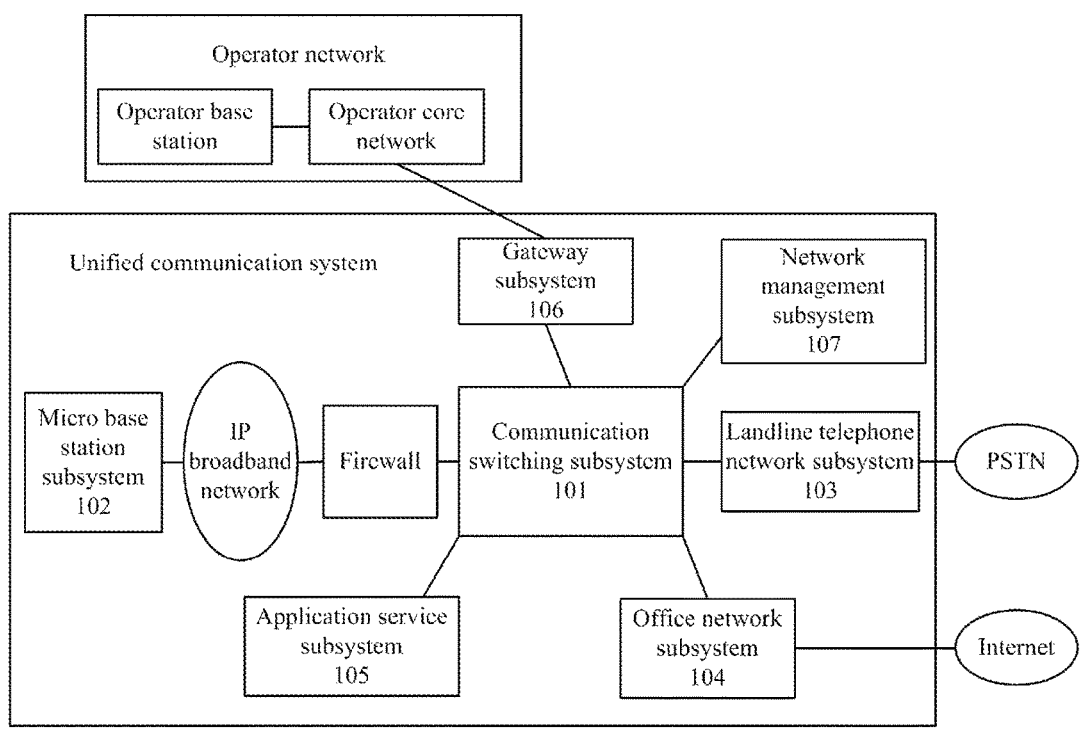
FIG. 3 is a system architectural schematic diagram of a unified communication system based on micro base station according to some embodiments of the present invention.

Combining the unified communication systems based on micro base station illustrated in FIG. 1 and FIG. 2, FIG. 3 illustrates the system architecture of a unified communication system based on micro base station, and the descriptions below takes small cell as an example to implement the micro base station subsystem 102. As illustrated in FIG. 3, the unified communication system based on micro base station according to this embodiment includes network elements such as, a Small Cell micro base station subsystem 102, a gateway subsystem 106, a network managment subsystem 107, a communication switching subsystem 101, a landline telephone network subsystem 103, an office network subsystem 104 and an application service subsystem 105. The Small Cell micro base station subsystem 102 could be connected to the communication switching subsystem 101 via devices such as an Internet Protocol (IP) broadband network and a firewall. The communication switching subsystem 101 is connected to an operator core network via the gateway subsystem 106, and communicates with an operator base station via the operator core network, so as to communicate with a mobile extranet. The communication switching subsystem 101 could be connected to the Internet via the office subsystem 104, be connected to the PSTN network via the landline telephone network subsystem 103 to communicate with an external landline telephone terminal, be connected to the application service subsystem to provide services such as smart office applications and smart security applications, and be connected to the office network subsystem 104 to provide services such as handheld office, mobile documents, process approval, wireless printing, and wireless fax.

The small cell micro base station subsystem 102 could have all the functions an existing Small Cell micro base station has. For example, the Small Cell micro base station subsystem 102 could include a wireless signal transceiver unit and a display signal process unit. The wireless signal transceiver unit is configured to transmit, receive and process signals between a User Equipment (UE) and the Small Cell micro base station, to process signals between the Small Cell micro base station and the communication switching subsystem 101 during a communication process within an enterprise intranet, and to process signals between the Small Cell micro base station and the operator core network when it is needed to communicate with an operator extranet. In a specific example, the Small Cell micro base station subsystem 102 could have all the functions of a Node B (mobile base station) in existing mobile communication specifications (e.g. the $3^{rd}$ Generation Partnership Project (3GPP) R9/R10/R11) and most of the functions of a Radio Network Controller (RNC), including physical layer functions (Hybrid Automatic Repeat Request, HARQ), Media Access Control (MAC) layer scheduling, wireless access control, and mobility management. Moreover, the Small Cell micro base station subsystem 102 needs to implement functions as an interface to a core network, functions of signaling process as well as local and remote operation maintenance, and functions of work status monitoring together with alarm information reporting of the Small Cell micro base station subsystem 102. The method and architecture for the Small Cell micro base station subsystem 102 to implement these functions could adopt any existing form or any form that might appear in the future.

In addition, the Small Cell micro base station subsystem 102 could be configured with functional modules such as digital intermediate frequency processing module and a radio-frequency transceiver module, where the digital intermediate frequency processing module is configured for digital up and down conversion, A/D conversion (analog to digital conversion) and D/A conversion (digital to analog conversion); the radio frequency transceiver module completes the conversion between an intermediate frequency signal and a radio-frequency signal, and then finishes transmitting or receiving a radio-frequency signal via a power amplifier and filter module as well as an antenna.

The gateway subsystem 106 could include a signaling gateway and a security gateway, wherein the security gateway is connected to the communication switching subsystem 101, the signaling gateway is located between the security gateway and the operator core network, the signaling gateway is configured to perform signaling process, and the security gateway is configured to ensure the transmission security. The security gateway may be configured to use the common IPSec (Internet Protocol Security) protocol, supporting the creation and management of IPSec tunnels, providing safe and reliable communication transmission and access authentication between the Small Cell micro base station subsystem 102 and the signaling gateway, and ensuring the safety of the entire unified communication system. In addition, the security gateway can fully guarantee the network security, prevent malicious attacks from extranets, and protect against attacks such as common DDoS (Distributed Denial of Service) attacks, scanning and snooping, malformed packet attack and brute force attack. The security gateway can also ensure the security of the service, encrypt a packet and protect its integrity through establishing an end-to-end IPSec VPN (Virtual Private Network) tunnel, to protect against external snooping, and to prevent the packet from malicious modification or damage from the transmission process. The security gateway can also ensure device security, prevent access by an illegal Small Cell micro base station subsystem 102; it also can employ a two-way authentication mechanism to secure the legitimacy of the Small Cell micro base station subsystem 102. The signaling gateway can support extensions based on 3GPP standard interface between the Small Cell micro base station subsystem 102 and the core network, and can support access by large number of Small Cell micro base station subsystem 102, to converge and forward signaling between the security gateway and the operator core network. Moreover, the signaling gateway may also have a centralized function of the control plane, so that the operator core network does not have to be impacted by the large amount of signaling generated by the establishment and release of the SCTP (Stream Control Transmission Protocol) connection initiated by the frequent switching of the Small Cell micro base station subsystem 102. The abovementioned various security mechanisms of the security gateway and the signaling gateway, may be achieved by any existing means or means that might appear in the future.

The network management subsystem 107 monitors and manages the Small Cell micro base station subsystem 102 and the gateway subsystem 106, as well as manages an authentication of wireless user of enterprise network by obtaining the user's authentication data from HLR (Home Location Register, a database responsible for the management of mobile users), and completing an authentication between the user and the network. In a specific example, the network management subsystem 107 may be implemented by using an interface of a standard specification protocol such as the TR069 (Technical Report 069, CPE WAN Management Protocol) and Web Service (a service-oriented architecture technology that provides services through a standard Web protocol). Specific ways of monitoring and managing related subsystems, as well as managing the authentication of users, could be any existing way or way that might occur in the future.

The communication switching subsystem 101 mainly completes the service separation and data exchange between the circuit domain and the packet domain within the enterprise network, implements information exchange and convergence of the mobile communication network, landline telephone network and office network within the enterprise, processes conversation services between a landline telephone terminal and a mobile terminal (e.g. a mobile phone) within the enterprise or between two mobile terminals within the enterprise, docks the enterprise internal mobile communication network into the operator mobile communication network, ensures seamless communication between an internal mobile communication user of the enterprise and a mobile communication user of the operator, and manages information of the enterprise internal mobile communication users.

The landline telephone subsystem 103 mainly processes communications between landline telephones within and outside the enterprise, as well as communications between a landline telephone and a mobile terminal (e.g. a mobile phone) within the enterprise, provides free communication between landline telephones within the enterprise, and can have functions of applications such as landline telephone conversation recording, extension permissions, changing an extension's number and line testing.

The office network subsystem 104 mainly docks the wireless network within the enterprise to itself, allowing wireless access to mobile office within the enterprise network, and integrating various office applications in the office network subsystem 104 to have functions such as handheld office, mobile document, process approval, wireless printing and wireless fax.

The application service subsystem 105 mainly docks services within the enterprise to itself, and it could customize a personalized value-added application for the enterprise, provide intelligent office applications (such as broadcasting system and intelligent conference system), and intelligent security applications (such as positioning system, wireless monitoring and access control), improve working efficiency of the enterprise, and reduce operating costs of the enterprise.

Based on the system architecture illustrated in FIG. 3, the unified communication system based on micro base station according to the present invention is docked into the operator communication system in the following way.

Within the enterprise, the communication switching subsystem 101 is connected to the Small Cell micro base station subsystem 102 and the landline telephone network subsystem 103, the integration of 2G/3G/4G (the second-generation mobile communication technology/ the third generation of mobile communication technology/ the fourth generation of mobile communication technology) mobile communication network, landline telephone network and office network within the enterprise is achieved through the communication switching subsystem 101.

The Small Cell micro base station subsystem 102, as the internal communication network of the enterprise, is connected to the operator core network via the gateway subsystem 106, and thus achieves connection between the enterprise intranet communication and the operator public network communication. But in the architecture, the enterprise internal communication system is completely separated from the operator public network communication system, which ensures the security of the enterprise intranet communication. The gateway subsystem 106, as the only link connecting the enterprise intranet communication system and the operator public network communication system, isolates other network elements within the enterprise intranet communication system from connecting the operator public network communication system, ensures the communication security and achieves the integration of the mobile communication network, landline telephone network and office network within the enterprise.

The system structure of the unified communication system based on micro base station according to the present invention as illustrated in FIG. 3 is taken as an example to explain some of the communication processes below.

Figure 4:
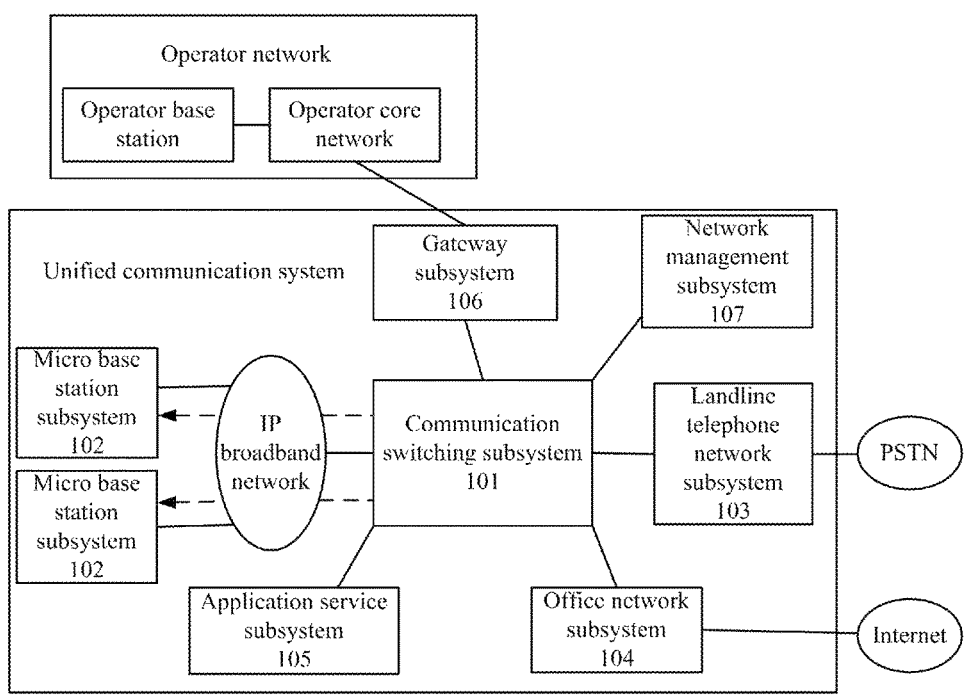
FIG. 4 is a schematic diagram of the conversation process between two mobile communication terminals in an enterprise intranet according to some embodiment of the present invention.

FIG. 4 illustrates a communication process between two mobile communication terminals within an enterprise intranet. The dotted lines represent the signal flows.

As illustrated in FIG. 4, when two or more enterprise intranet users use mobile terminals to call each other within the unified communication system based on Small Cell micro base stations according to the present invention, the voice service request of the caller will enter the communication switching subsystem 101 via the Small Cell micro base station subsystem 102, the communication switching subsystem 101 identifies that the called user is a mobile communication user of the enterprise intranet according to the identification information of the called user in the voice service request (which in the example is the called user's mobile phone number), the communication switching subsystem 101 pages the called user under the Small Cell micro base station subsystem 102 within the network and connects to the phone, to achieve communication between mobile terminals within the enterprise intranet. It can be seen that the conversation between mobile communication users within the enterprise intranet totally depends on the internal communication switching subsystem 101 and the Small Cell micro base station subsystem 102, the conversation service process of mobile communication terminals can be completed within the intranet, without involvement of the operator public network communication system in the communication processing, and is absolutely isolated from external operator public network communication system, thereby ensuring communication security.

Figure 5:
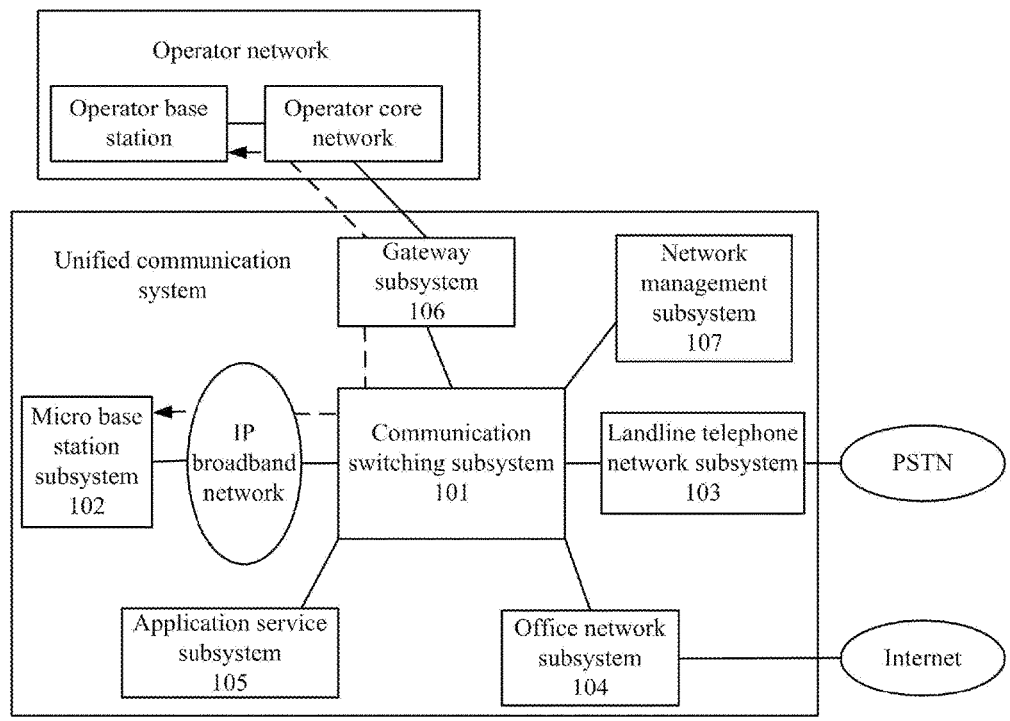
FIG. 5 is a schematic diagram of the conversation process between a mobile communication user in an enterprise intranet and a mobile communication user in an operator public network according to some embodiments of the present invention.

FIG. 5 illustrates a conversation process between an enterprise intranet mobile communication user within the unified communication system based on micro base station and an operator public network mobile communication user. The dotted lines in FIG. 5 represent signal flows.

As illustrated in FIG. 5, when an enterprise internal user uses a mobile terminal to make a call under the unified communication system based on Small Cell micro base station 102 according to the present invention, to a mobile terminal user in an operator public network communication system, the caller's voice service request would enter the communication switching subsystem 101 through the Small Cell micro base station subsystem 102, the communication switching subsystem 101 identifies the called user is a mobile communication user of the operator public network communication system according to the identification information of the called user in the voice service request (which in the example is the called user's mobile phone number), the communication switching subsystem 101 links to the operator core network via the gateway subsystem 106 and then performs the traditional conversation process of a Small Cell.

On the other hand, when a user in the operator public network communication system uses a mobile terminal to call a mobile terminal user within the unified communication system based on micro base station according to the present invention, the caller's voice service request would enter the communication switching subsystem 101 via the operator core network and the gateway subsystem 106, the communication switching subsystem 101 identifies the called user is a mobile communication user within the enterprise intranet according to the identification information of the called user in the voice service request (which in the example is the called user's mobile phone number), then pages the called user under the Small Cell micro base station subsystem 102 within the network and connect to the phone, to achieve communication between two mobile terminals outside and within the enterprise intranet.

It can be seen that, the gateway subsystem 106, as the only link connecting the enterprise intranet communication system and the operator public network communication system, isolates the other network elements in the enterprise intranet communication system from connecting with the operator public network communication system and ensures the communication security.

Figure 6:
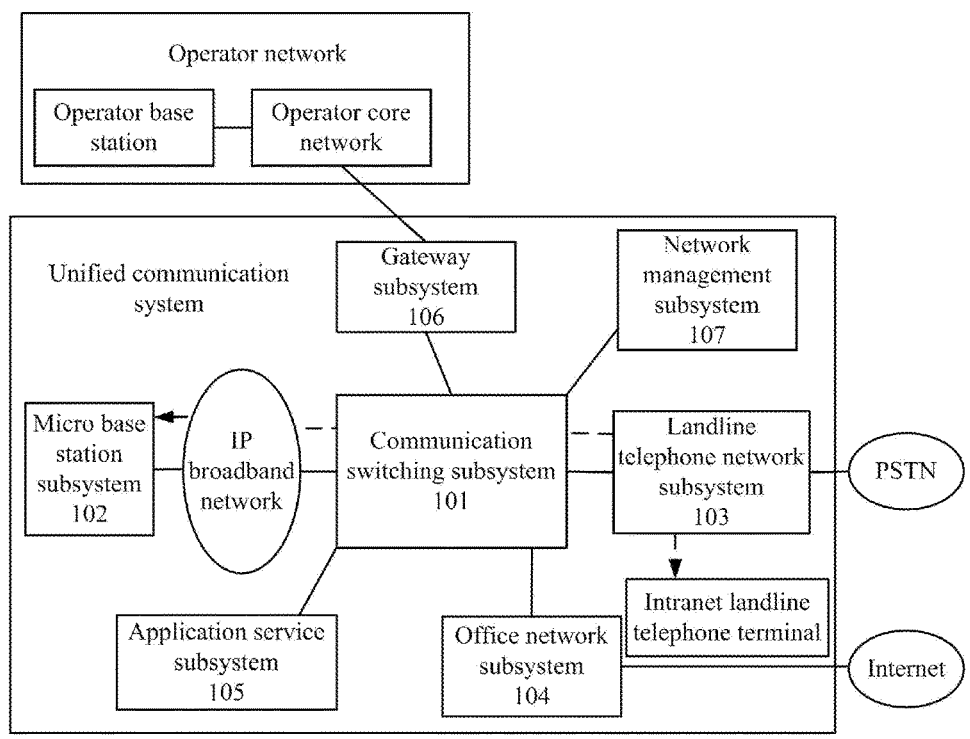
FIG. 6 is a schematic diagram of the conversation process between an intranet mobile terminal and an intranet landline telephone terminal according to some embodiments of the present invention.

FIG. 6 illustrates a schematic diagram of a conversation process between an intranet mobile terminal and an intranet landline telephone terminal within a unified communication system based on micro base station. The dotted line in FIG. 6 represents signal flows. When a user uses a mobile terminal to dial a landline telephone terminal within the unified communication system based on micro base station according to the present invention, the caller's voice service request would enter the communication switching subsystem 101 via the Small Cell micro base station subsystem 102, the communication switching subsystem 101 identifies that the called user is a landline telephone user according to the identification information of the called user in the voice service request (which in the example is the called user's landline telephone number), forwards the voice service request to the landline telephone network subsystem 103, the landline telephone network subsystem 103 identifies that the called user is an enterprise intranet landline telephone user according to the identification information of the called user in the voice service request (which in the example is the called user's landline telephone number), and connects to the corresponding landline telephone terminal to achieve communication between a mobile terminal and a landline telephone terminal within the enterprise, i.e. the integration of the mobile communication network and the landline telephone network within the enterprise.

Accordingly, when an intranet landline telephone user within the unified communication system based on micro base station according to the present invention calls an intranet mobile user, after the voice service request enters the landline telephone network subsystem 103, the landline telephone network 103 identifies that the called user is a mobile communication user according to identification information of the called user in the voice service request (which in the example is the mobile phone number of the called user), then forwards the voice service request to the communication switching subsystem 101, the communication switching subsystem 101 identifies that the called user is an enterprise intranet mobile communication user according to the identification information of the called user in the voice service request (which in the example is the called user's mobile phone number), pages the called user under the Small Cell micro base station subsystem 102 within the intranet and connects to the phone, thereby achieving a two-way conversation process between the landline telephone terminal and the mobile terminal within the intranet in the unified communication system based on micro base station.

Figure 7:
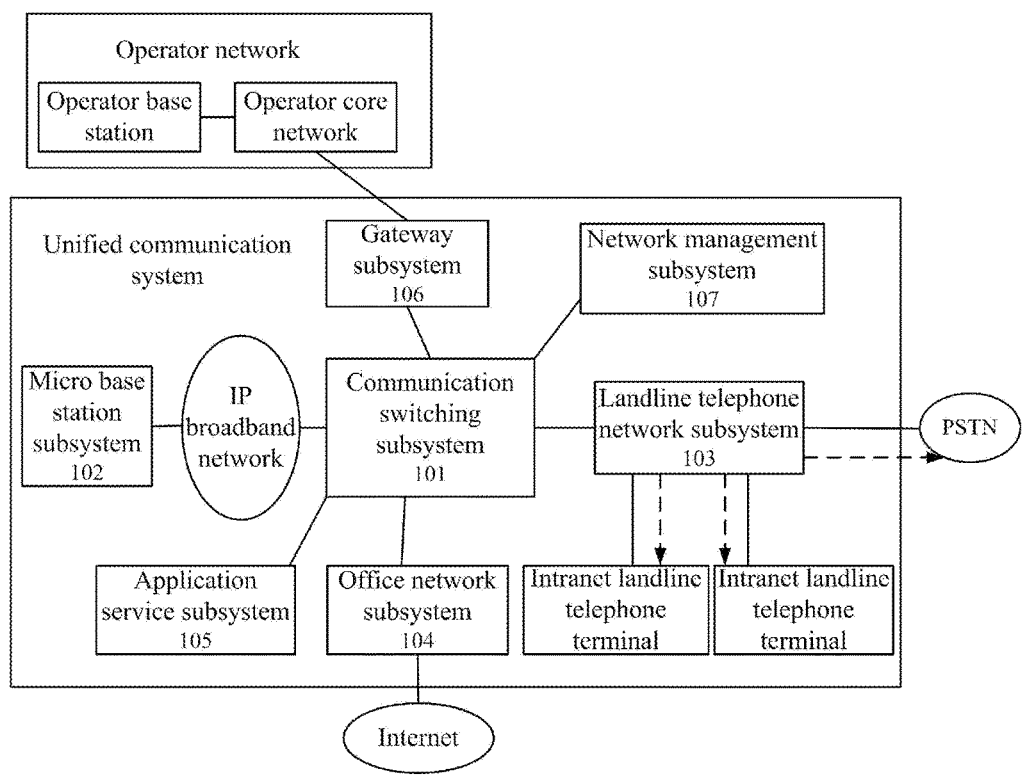
FIG. 7 is a schematic diagram of the conversation process between two intranet landline telephone terminals or between an intranet landline telephone terminal and an extranet landline telephone terminal according to some embodiments of the invention.

FIG. 7 illustrates a schematic diagram of a conversation process between two intranet landline telephone terminals in a unified communication system based on micro base station or between an intranet landline telephone terminal in a unified communication system based on micro base station and an extranet landline telephone terminal. The dotted lines in FIG. 7 represent signal flows. When in a unified communication system based on micro base station according to the present invention, a user uses an intranet landline telephone terminal to call another landline telephone terminal, after the voice service request enters the landline telephone network subsystem 103, the landline telephone network subsystem 103 would judge whether the called user is an enterprise intranet landline telephone user or an enterprise extranet landline telephone user according to the identification information of the called user in the voice service request (which in the example is the called user's landline telephone number), if the called user is an enterprise extranet landline telephone user then the landline telephone network subsystem connects to the PSTN network, and if the called user is an enterprise intranet landline telephone user then the landline telephone network subsystem connects to the corresponding landline telephone terminal, thereby achieving the communication between the enterprise intranet landline telephone terminal and another enterprise intranet landline telephone terminal or an enterprise extranet landline telephone terminal.

Accordingly, when a user uses an extranet landline telephone terminal to call an intranet landline telephone terminal according to solutions of the present invention, after the voice service request enters the landline telephone network subsystem 103, the landline telephone network subsystem 103 would identify that the called user is an enterprise intranet landline telephone user according to the identification information of the called user in the voice service request (which is the landline telephone number of the called user in the example), connect to the corresponding landline telephone terminal and achieve communication between an extranet landline telephone terminal and an enterprise intranet landline telephone terminal.

Figure 8:
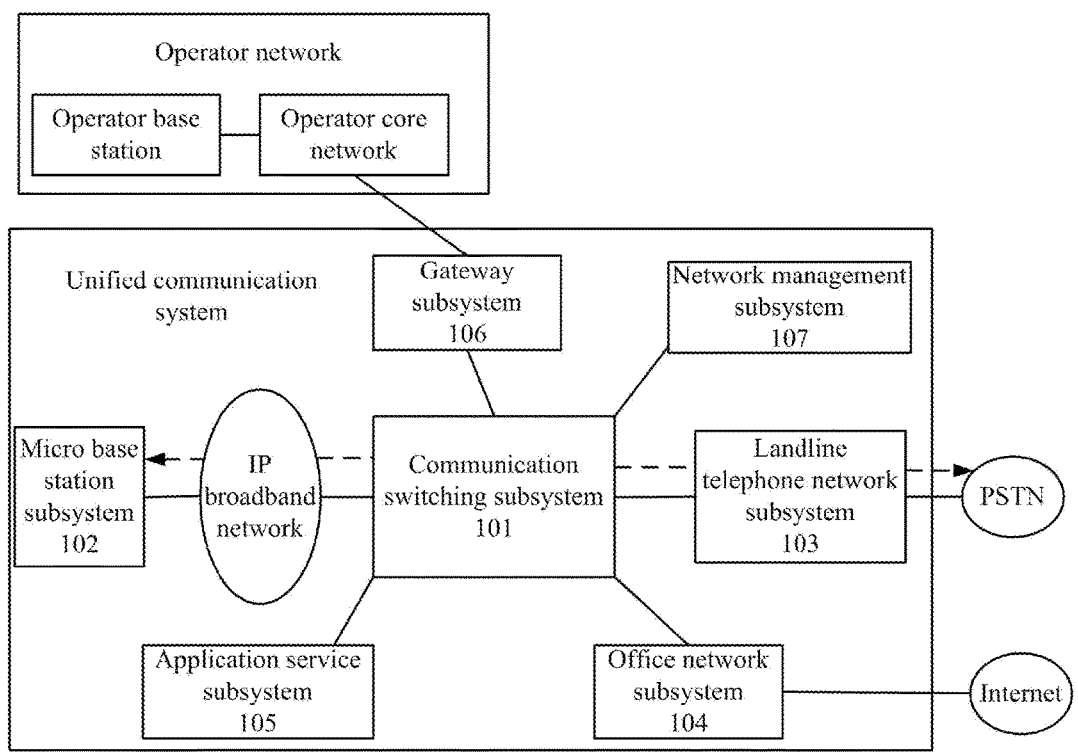
FIG. 8 is a schematic diagram of the conversation process between a mobile communication terminal in an enterprise intranet and an extranet landline telephone terminal according to some embodiments of the invention.

FIG. 8 illustrates a schematic diagram of the conversation process between an enterprise intranet mobile communication terminal in a unified communication system based on micro base station and an extranet landline telephone terminal. The dotted lines represent signal flows.

When in a unified communication system based on micro base station according to the present invention, a user uses a mobile terminal to call an extranet landline telephone, the caller's voice service request would enter the communication switching subsystem 101 through a Small Cell micro base station subsystem 102, the communication switching subsystem 101 identifies that the called user is a landline telephone user according to the identification information of the called user in the voice service request (which is the called user's landline telephone number in the example), forwards the voice service request to the landline telephone network subsystem 103, the landline telephone network subsystem 103 identifies that the called user is an enterprise extranet landline telephone user according to the identification information of the called user in the voice service request (which is the called user's landline telephone number), and then forwards the voice service request into the PSTN network, thereby achieving communication between an enterprise intranet mobile terminal and an extranet landline telephone terminal.

Accordingly, when an intranet mobile terminal according to the solutions of the present invention is called by a user using an extranet landline telephone terminal, after the voice service request enters the landline telephone network subsystem 103, the landline telephone subsystem 103 would identify that the call user is a mobile communication user according to the identification information of the called user in the voice service request (which is the called user's mobile phone number in the example), forwards the voice service request to the communication switching subsystem 101, the communication switching subsystem 101 identifies that the called user is an enterprise intranet mobile communication user according to the identification information of the called user in the voice service request (which is the called user's mobile phone number in the example), then calls the called user under the Small Cell micro base station subsystem 102 within the intranet and connects to the phone, thereby achieving the two-way conversation process between an intranet mobile terminal within the unified communication system and an extranet landline telephone terminal.

Figure 9:
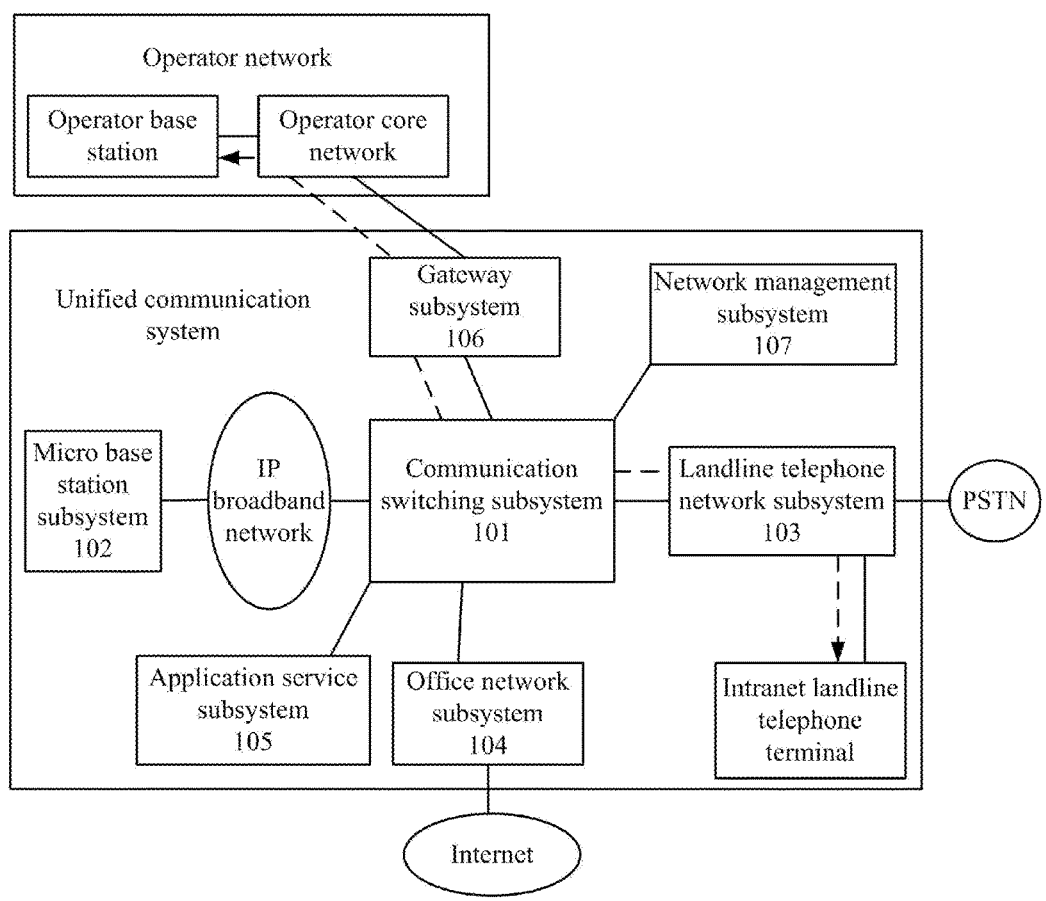
FIG. 9 is a schematic diagram of the conversation process between an intranet landline telephone user in an enterprise network and a mobile communication user in an operator public network according to some embodiments of the invention.

FIG. 9 illustrates a schematic diagram of the conversation process between an enterprise intranet landline telephone user in a unified communication system based on micro base station and an operator public network mobile communication user. The dotted lines represent signal flows.

When an intranet landline telephone user in a unified communication system based on micro base station according to the present invention called an extranet mobile user, after the voice service request enters the landline telephone network subsystem 103, the landline telephone network subsystem 103 would identify that the called user is a mobile communication user according to the identification information of the called user in the voice service request (which is the called user's mobile phone number in the example), and forwards the voice service request to the communication switching subsystem 101, which identifies that the called user is a mobile communication user in the operator public network communication system according to the identification information of the called user in the voice service request (which is the called user's mobile phone number in the example), and then connects the conversation link to the operator core network via the gateway subsystem 106, and then a conventional conversation process between a mobile terminal and a landline telephone terminal starts.

On the other hand, when a user in the operator public network communication system uses a mobile terminal to call a landline telephone terminal within the unified communication system based on micro base station according to the present invention, the call's voice service request would be forwarded to the gateway subsystem 106 through the operator core network and then enter the communication switching subsystem 101, the communication switching subsystem 101 would identify that the called user is a landline telephone user according to the identification information of the called user in the voice service request (which is the landline telephone number of the called user), and forward the voice service request to the landline telephone network subsystem 103, which would identify that the called user is an enterprise intranet landline telephone user according to the identification information of the called user in the voice service request (which is the called user's landline telephone number in the example), and connect to the corresponding landline telephone terminal, thereby achieving communication between an extranet mobile terminal and an intranet landline telephone terminal.

Figure 10:
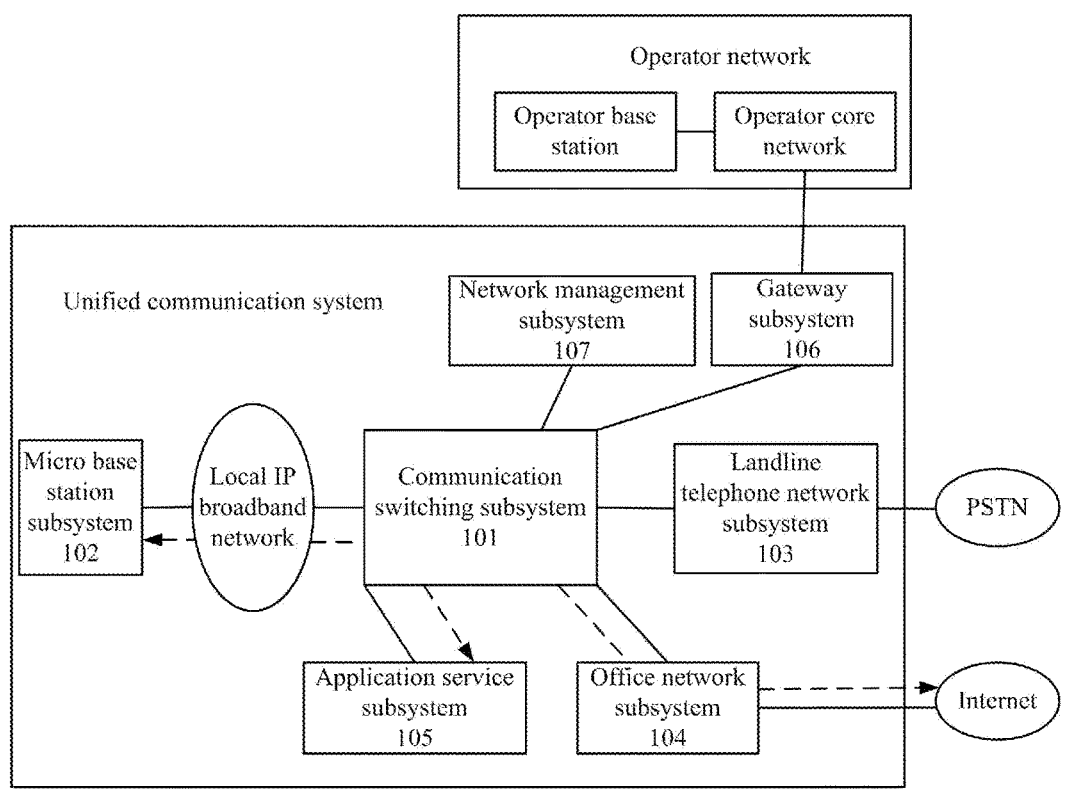
FIG. 10 is a flow chart of the communication between a mobile terminal in an enterprise intranet and an office network subsystem according to some embodiments of the invention.

FIG. 10 illustrates a communication process of an enterprise intranet mobile terminal data service within a unified communication system based on micro base station, where the dotted lines represent signal flows.

After deploying a unified communication system based on Small Cell inside an enterprise, when a mobile terminal accesses a Small Cell micro base station subsystem 102 to process a data service, the service request is transmitted by a local IP broadband network and then enters the communication switching subsystem 101 of the enterprise, which would judge whether the service request is in the enterprise intranet or the Internet, if the service request is in the enterprise intranet, the communication switching subsystem 101 sends user objects to the application service subsystem or the office network subsystem 104, if the service request is in the Internet, then the communication switching subsystem 101 sends user objects to the Internet via the office network subsystem 104, thereby improving the information security of the enterprise, reducing the traffic pressure of the operator mobile communication network and the moblie office traffic costs of the enterprise.

Figure 11:
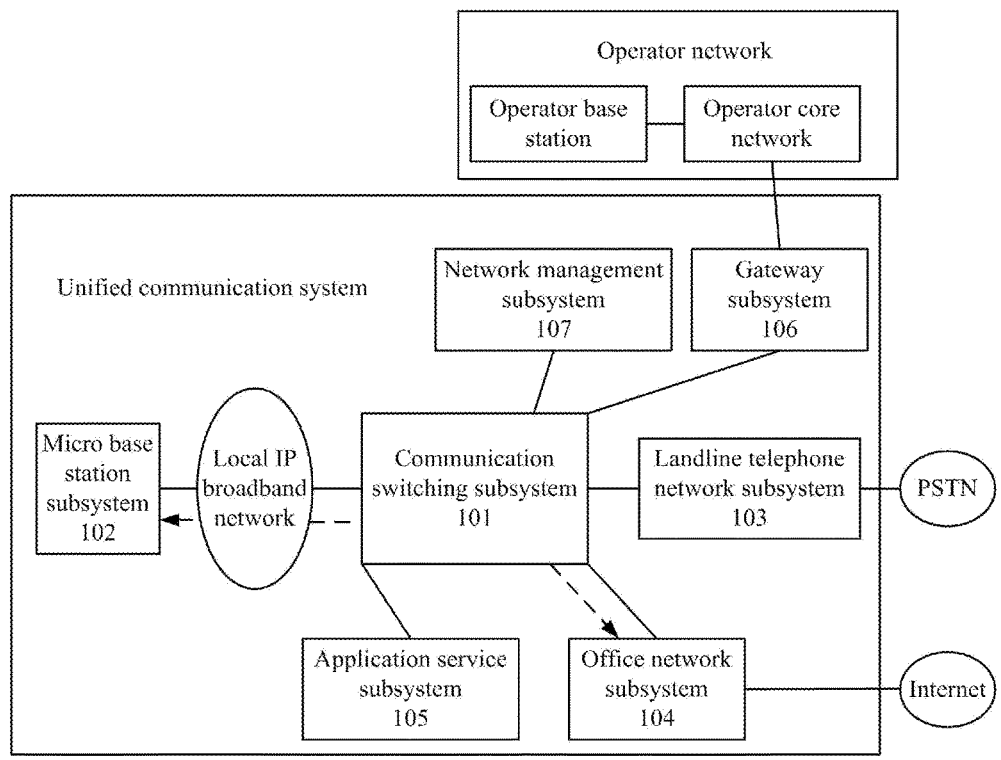
FIG. 11 is a schematic diagram of the communication process of the mobile terminal data service within an enterprise intranet according to some embodiments of the invention.

FIG. 11 illustrates a communication process of an enterprise intranet mobile terminal within a unified communication system based on micro base station and the office network subsystem 104, where the dotted lines represent signal flows.

After deploying a unified communication system based on Small Cell inside an enterprise, when a mobile terminal accesses a Small Cell micro base station subsystem 102 and initiates an office application request to the office network subsystem 104, the office application request is transmitted by a local IP broadband network and then enters the communication switching subsystem 101 of the enterprise, which identifies that the service request of the user should be received by the office network subsystem 104, and then transmits the service of the mobile terminal to the office network subsystem 104, and the office network subsystem 104 performs service processing.

In embodiments of the invention, as to services of the application service subsystem 105 within the enterprise, when the unified communication system based on Small Cell micro base station is deployed, the application service subsystem 105 is deployed according to business demands of the enterprise by utilizing features and advantages of the system, which could customize a personalized value-added application for the enterprise, provide intelligent office applications (such as broadcasting system and intelligent conference system), and intelligent security applications (such as positioning system, wireless monitoring and access control), improve working efficiency of the enterprise, and reduce operating costs of the enterprise.

Accordingly, a broadcast SMS push service is also provided by the application service subsystem 105 according to embodiments of the present invention, which, taking advantage of the Small Cell's features of small coverage area and clear location, based on user location status, could send targeted text, audio or video prompts to a specified user, and achieve functions such as reminders, notices, and announcements.

An intelligent conference system is also provided by the application service subsystem 105 according to the embodiments of the present invention, which, taking advantage of the feature that the communication switching subsystem 101 deployed in the enterprise unified communication system connects both the Small Cell network inside the enterprise and the operator PSTN landline telephone network, could implement telephone conferences of landline telephone terminals and mobile phones based on the enterprise network, and send conference notice to a specified user through a broadcasting system. The utilization of the intelligent conference system could make a telephone conference more convenient, improve working efficiency, and reduce operating costs of the enterprise.

Based on the architecture of the unified communication system based on micro base station according to the present invention as described above, two implementations will be described in detail below.

Figure 12:
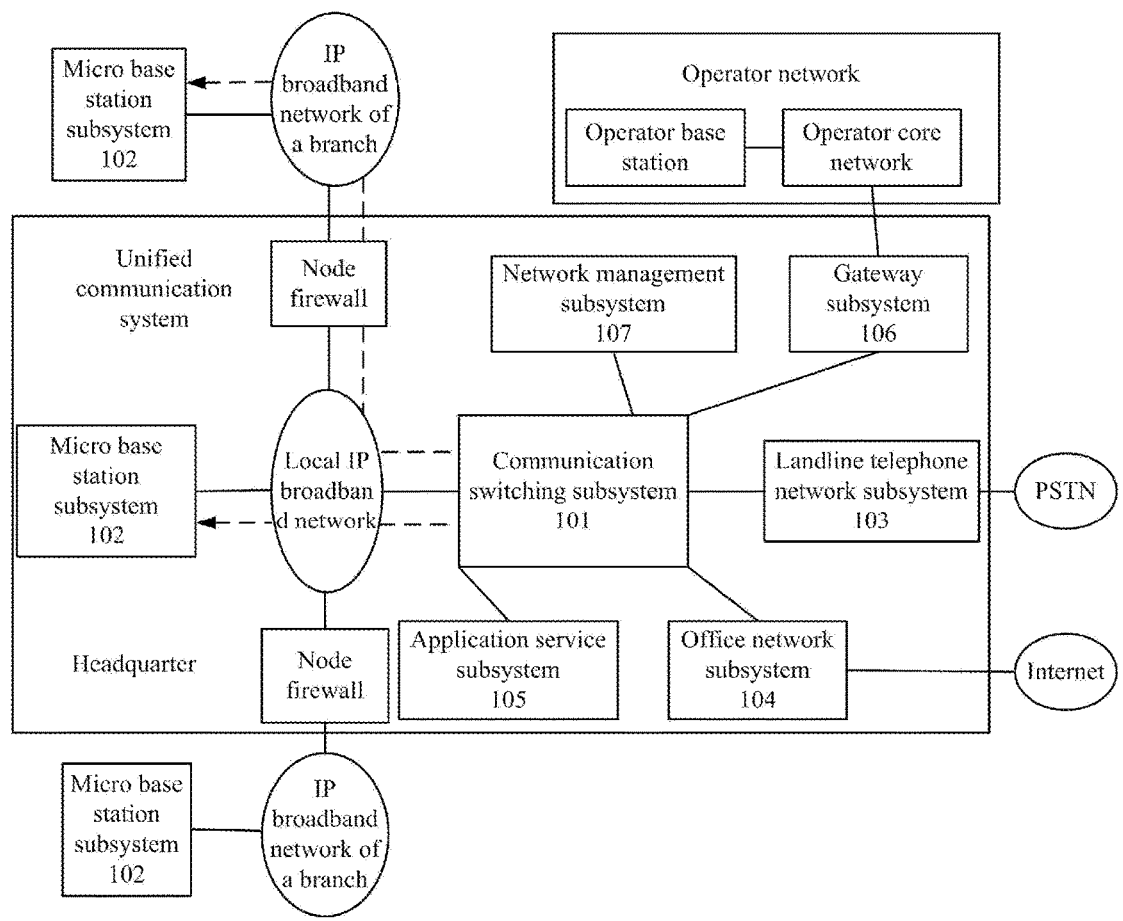
FIG. 12 is a schematic diagram of a large-scale enterprise deploying a unified communication system based on Small Cell micro base station according to some embodiments of the invention.

FIG. 12 illustrates the architecture of a large-scale enterprise (with branches in different physical areas) where a unified communication system based on Small Cell micro base station is deployed. With the deployment of a cross-regional unified communication system based on Small Cell micro base station in the large-scale enterprise (with branches in different physical areas), if a user in a branch uses a mobile terminal to call a mobile terminal user in the headquarter through the unified communication system based on Small Cell micro base station, the caller's call would pass through a Small Cell micro base station subsystem 102, connect to the node firewall of the headquarter via the local IP broadband network to enter the IP broadband network of the headquarter, and finally enter the communication switching subsystem 101 of the enterprise. The communication switching subsystem 101 of the enterprise would identify that the called user is an enterprise intranet user, then page the user under a Small Cell micro base station subsystem 102 of the intranet headquarter, and connect to the phone. The dotted lines in FIG. 12 represent signal flows.

Accordingly, embodiments of the invention also provide the structure of a small-scale enterprise (without cross-regional branches) where a unified communication system based on Small Cell micro base station is deployed. For the specific structure, please refer to the structure of a unified communication system illustrated in FIG. 4. With the deployment of a unified communication system based on Small Cell micro base station in the small-scale enterprise (without cross-regional branches), when a user uses a mobile terminal to call another mobile terminal user through the unified communication system based on Small Cell micro base station, the caller's call would pass through a Small Cell micro base station subsystem 102 and the local IP broadband network to enter the communication switching subsystem 101, which would identify that the called user is an intranet mobile user, page the user under a Small Cell micro base station subsystem 102 of the intranet and connect to the phone. The dotted lines in the figures represent signal flows.

In summary, the unified communication system based on Small Cell micro base station according to the embodiments of the present invention, allows an operator to integrate various private line services, to directly increase the revenue of group's informatization, to save investment by building multiple networks in cooperation, and to enhance the market share by providing competitive tariff plan for enterprise users. It also allows enterprises to build a landline telephone cable network and an office network all at once, which improves efficiency and reduces costs; isolates internal and extranet communication, which greatly improves security and provides reliable and secure communications; and allows all the mobile phones and landline telephone terminals within the enterprise to use short numbers to communicate with each other, which reduces the communication costs within the enterprise. The application platform of the unified communication system based on Small Cell micro base station improves working efficiency, lowers communication costs, achieves value-added services, and has good practical values.

It will be appreciated by those skilled in the art that the embodiments of the present invention may be provided as a method, system, or computer program product. Therefore, the present invention may take the form of a fully hardware embodiment, a fully software embodiment, or an embodiment combining software and hardware aspects. Moreover, the invention may take the form of a computer program product implemented on one or more computer usable storage media (including but not limited to magnetic disk storage, CD-ROM and optical storage, etc.) containing computer usable program code therein.

The present invention has been described in a flow chart and/or a block diagram of the method, the device (system) and the computer program product according to the embodiments of the present invention. It shall be appreciated that respective flows and/or blocks in the flow chart and/or the block diagram and combinations of the flows and/or the blocks in the flow chart and/or the block diagram can be embodied in computer program instructions. These computer program instructions can be loaded onto a general-purpose computer, a specific-purpose computer, an embedded processor or a processor of another programmable data processing device to produce a machine so that the instructions executed on the computer or the processor of the other programmable data processing device create means for performing the functions specified in the flow(s) of the flow chart and/or the block(s) of the block diagram.

These computer program instructions can also be stored into a computer readable memory capable of directing the computer or the other programmable data processing device to operate in a specific manner so that the instructions stored in the computer readable memory create an article of manufacture including instruction means which perform the functions specified in the flow(s) of the flow chart and/or the block(s) of the block diagram.

These computer program instructions can also be loaded onto the computer or the other programmable data processing device so that a series of operational steps are performed on the computer or the other programmable data processing device to create a computer implemented process so that the instructions executed on the computer or the other programmable device provide steps for performing the functions specified in the flow(s) of the flow chart and/or the block(s) of the block diagram.

Although the embodiments of the present invention have been described, those skilled in the art benefiting from the underlying inventive concept can make additional modifications and variations to these embodiments. Therefore the appended claims are intended to be construed as encompassing the embodiments and all the modifications and variations coming into the scope of the present invention.

Evidently those skilled in the art can make various modifications and variations to the present invention without departing from the spirit and scope of the present invention. Thus the present invention is also intended to encompass these modifications and variations thereto so long as the modifications and variations come into the scope of the claims appended to the present invention and their equivalents.

The invention claimed is:

1. A unified communication system based on micro base station, comprising:
    a micro base station subsystem, a landline telephone network subsystem, an office network subsystem and a communication switching subsystem, wherein the micro base station subsystem, the landline telephone network subsystem, the office network subsystem are connected with the communication switching subsystem respectively, and wherein:
    the micro base station subsystem is configured to receive a voice service request from a mobile terminal, and send the voice service request to the communication switching subsystem; receive a voice service request from the communication switching subsystem, and send the voice service request from the communication switching subsystem to a mobile terminal corresponding to identification information of a called user in the voice service request;
    the landline telephone network subsystem is configured to receive a voice service request from a landline telephone terminal or a Public Switching Telephone Network (PSTN), and send the voice service request to the communication switching subsystem when a called user in the voice service request is a mobile communication user; receive a voice service request from the communication switching subsystem, connect to an intranet landline telephone terminal corresponding to identification information of a called user in the voice service request when the called user in the voice service request is an intranet landline telephone user, or send the voice service request to the PSTN when the called user in the voice service request is an extranet landline telephone user;
    the office network subsystem is configured to receive a service request from the communication switching subsystem, and when the service request is an office service request, process an office service, or when the service request is a data service request, send the data service request to the Internet;
    the communication switching subsystem is configured to receive a voice service request from the micro base station subsystem and the landline telephone network subsystem, send the voice service request to the micro base station subsystem when a called user in the voice service request is a mobile communication intranet user, or send the voice service request to the landline telephone network subsystem when the called user in the voice service request is a landline telephone network user, wherein landline telephone network users comprise intranet landline telephone users and extranet landline telephone users, mobile communication users comprise mobile communication intranet users; receive a service request from the micro base station subsystem, and send the service request to the office network subsystem;
wherein the system further comprises:
    an application service subsystem, wherein the application service subsystem connects with the communication switching subsystem;

the application service subsystem is configured to receive an application service request through the communication switching subsystem, process an application service and send an application service request to the communication switching subsystem;

the communication switching subsystem is configured to receive an application service request from the application service subsystem, send the application service request to the micro base station subsystem when a called user in the application service request is a mobile communication intranet user, or send the application service request to the landline telephone network subsystem when the called user in the application service request is a landline telephone network user;

the mobile communication users further comprise mobile communication extranet users.

2. The system according to claim 1, wherein the system further comprises a gateway subsystem and a network management subsystem, wherein the network management subsystem and the communication switching subsystem are connected with each other and the communication switching subsystem is connected with an operator core network via the gateway subsystem;

the gateway subsystem is configured to receive a voice service request or an application service request from the communication switching subsystem, and send the voice service request or the application service request to the operator core network, wherein a user in the voice service request or the application service request from the communication switching subsystem is a mobile communication extranet user; the network management subsystem is configured to monitor and manage the micro base station system, the gateway subsystem, the landline telephone network subsystem, the office network subsystem and the application service subsystem, as well as to manage an authentication of a mobile terminal so as to implement an authentication between a user and the network;

the communication switching subsystem is further configured to receive a voice service request from the gateway subsystem, send the voice service request to the micro base station subsystem when a called user in the voice service request is a mobile communication intranet user, or send the voice service request to the landline telephone network subsystem when the called user in the voice service request is a landline telephone network user; and after having received a voice service request from the micro base station subsystem or the landline telephone network subsystem, send the voice service request to the gateway subsystem when the called user in the voice service request is a mobile communication extranet user; or after having received an application service request from the application service subsystem, send the application service request to the gateway subsystem when the called user in the application service request is a mobile communication extranet user.

3. The system according to claim 2, wherein the gateway subsystem comprises a signaling gateway and a security gateway, wherein the security gateway is connected to the communication switching subsystem; the signaling gateway is connected to both the security gateway and the operator core network, and is located between the security gateway and the operator core network.

4. The system according to claim 1, wherein the landline telephone network subsystem, is further configured to, after having received a voice service request from a landline telephone terminal, connect with an intranet landline telephone terminal corresponding to the identification information of called user in the voice service request if the called user in the voice service request is an intranet landline telephone user, or forward the voice service request to the PSTN if the called user in the voice service request is an extranet landline telephone user.

5. The system according to claim 2, wherein after having received a voice service request from the micro base station subsystem or the gateway subsystem, the communication switching subsystem converts the voice service request into landline telephone communication information and sends it to the landline telephone network subsystem when the called user in the voice service request is a landline telephone network user.

6. The system according to claim 2, wherein after having received a voice service request from the landline telephone network subsystem, the communication switching subsystem converts the voice service request into a mobile communication voice service request and sends it to the gateway subsystem or the micro base station subsystem when the called user in the voice service request is a mobile communication user.

7. The system according to claim 1, wherein the micro base station subsystem is a Femto micro base station subsystem or a Small Cell micro station subsystem.

8. The system according to claim 1, wherein the landline telephone network subsystem, is further configured to, after having received a voice service request from a landline telephone terminal, connect with an intranet landline telephone terminal corresponding to the identification information of called user in the voice service request if the called user in the voice service request is an intranet landline telephone user, or forward the voice service request to the PSTN if the called user in the voice service request is an extranet landline telephone user.

9. The system according to claim 2, wherein the landline telephone network subsystem, is further configured to, after having received a voice service request from a landline telephone terminal, connect with an intranet landline telephone terminal corresponding to the identification information of called user in the voice service request if the called user in the voice service request is an intranet landline telephone user, or forward the voice service request to the PSTN if the called user in the voice service request is an extranet landline telephone user.

10. The system according to claim 3, wherein the landline telephone network subsystem, is further configured to, after having received a voice service request from a landline telephone terminal, connect with an intranet landline telephone terminal corresponding to the identification information of called user in the voice service request if the called user in the voice service request is an intranet landline telephone user, or forward the voice service request to the PSTN if the called user in the voice service request is an extranet landline telephone user.

11. The system according to claim 3, wherein after having received a voice service request from the micro base station subsystem or the gateway subsystem, the communication switching subsystem converts the voice service request into landline telephone communication information and sends it to the landline telephone network subsystem when the called user in the voice service request is a landline telephone network user.

12. The system according to claim 3, wherein after having received a voice service request from the landline telephone network subsystem, the communication switching subsystem converts the voice service request into a mobile communication voice service request and sends it to the gateway subsystem or the micro base station subsystem when the called user in the voice service request is a mobile communication user.

13. The system according to claim 1, wherein the micro base station subsystem is a Femto micro base station subsystem or a Small Cell micro station subsystem.

14. The system according to claim 2, wherein the micro base station subsystem is a Femto micro base station subsystem or a Small Cell micro station subsystem.

15. The system according to claim 3, wherein the micro base station subsystem is a Femto micro base station subsystem or a Small Cell micro station subsystem.

* * * * *